United States Patent
Kojima et al.

(10) Patent No.: US 6,252,037 B1
(45) Date of Patent: Jun. 26, 2001

(54) POLYETHER POLYOL AND A METHOD FOR THE MANUFACTURE OF MOULDABLE POLYESTER CONTAINING SAID POLYETHER POLYOL

(75) Inventors: Shirou Kojima; Katsunobu Mochizuki, both of Tokyo (JP)

(73) Assignee: Unichema Chemie B.V., Gouda (NL)

( * ) Notice: Subject to any disclaimer, the term of this patent is extended or adjusted under 35 U.S.C. 154(b) by 0 days.

(21) Appl. No.: 09/242,935

(22) PCT Filed: Aug. 27, 1997

(86) PCT No.: PCT/NL97/00484

§ 371 Date: Feb. 26, 1999

§ 102(e) Date: Feb. 26, 1999

(87) PCT Pub. No.: WO98/08888

PCT Pub. Date: Mar. 5, 1998

(30) Foreign Application Priority Data

Aug. 28, 1996 (JP) .................................................. 8-243988
Dec. 5, 1996 (JP) .................................................. 8-340645

(51) Int. Cl.$^7$ .................................................. C08G 63/66
(52) U.S. Cl. ................................ 528/300; 528/80; 528/83; 528/301; 528/308; 528/308.6; 525/444
(58) Field of Search .................................. 528/300, 301, 528/308.6, 308, 80, 83; 525/444

(56) References Cited

U.S. PATENT DOCUMENTS

| | | | |
|---|---|---|---|
| 3,378,531 | 4/1968 | Heins et al. | 260/77.5 |
| 4,377,682 | 3/1983 | Ohguchi et al. | 528/301 |
| 5,101,009 | 3/1992 | Nakane et al. | 528/272 |
| 5,250,494 | * 10/1993 | Wehrmann et al. | 503/227 |
| 5,616,679 | 4/1997 | Fies et al. | 528/76 |
| 5,747,174 | 5/1998 | Kimura et al. | 428/480 |

FOREIGN PATENT DOCUMENTS

| | | |
|---|---|---|
| 427 110 | 12/1967 | (CH) . |
| 43 16 245 | 11/1994 | (DE) . |
| 44 29 345 | 2/1996 | (DE) . |
| 787 970 | 12/1957 | (GB) . |

OTHER PUBLICATIONS

Derwent Abstract No. 94–189035 (Abstract of Japanese Patent Kokai Hei 06–128363, May 1994).
Patent Abstracts of Japan, v. 96, No. 9, Sep. 1996 (Abstract of Japanese Patent Kokai Hei 08–120064, May 1996).
Derwent Abstract No. 91–261705 (Abstract of Japanese Patent Kokai Hei 03–252419, Nov. 1991), see 3.
Derwent Abstract No. 90–365412 (Abstract of Japanese Patent Kokai Hei 02–263827, Oct. 1990).
Derwent Abstract No. 93–288234 (Abstract of Japanese Patent Kokai Hei 06–079776, Mar. 1994), see 4.
Derwent Abstract No. 82–35484E (Abstract of Japanese Patent Kokai Sho 57–063325, Apr. 1982), see 5.

* cited by examiner

Primary Examiner—Samuel A. Acquah
(74) Attorney, Agent, or Firm—Heller Ehrman White & McAuliffe LLP

(57) ABSTRACT

Polyether polyol having the following chemical formula (1): HO—$(AO)_m$ZO—$(BO)_n$—H, which is suitable for the manufacture of polyester, polyurethane elastomer and polyurethane paint showing an excellent hydrolysis resistance is disclosed. In this formula, Z is a dimer diol residue; A and B are the same or different alkylene groups having 2–4 carbon atoms; and m and n are the same or different integers of 0 or more where $2 \leq (m+n) \leq 40$. Also disclosed is a method for the manufacture of mouldable polyester containing the above-mentioned polyether polyol as one of the constituting units.

9 Claims, 2 Drawing Sheets

Figure 1:
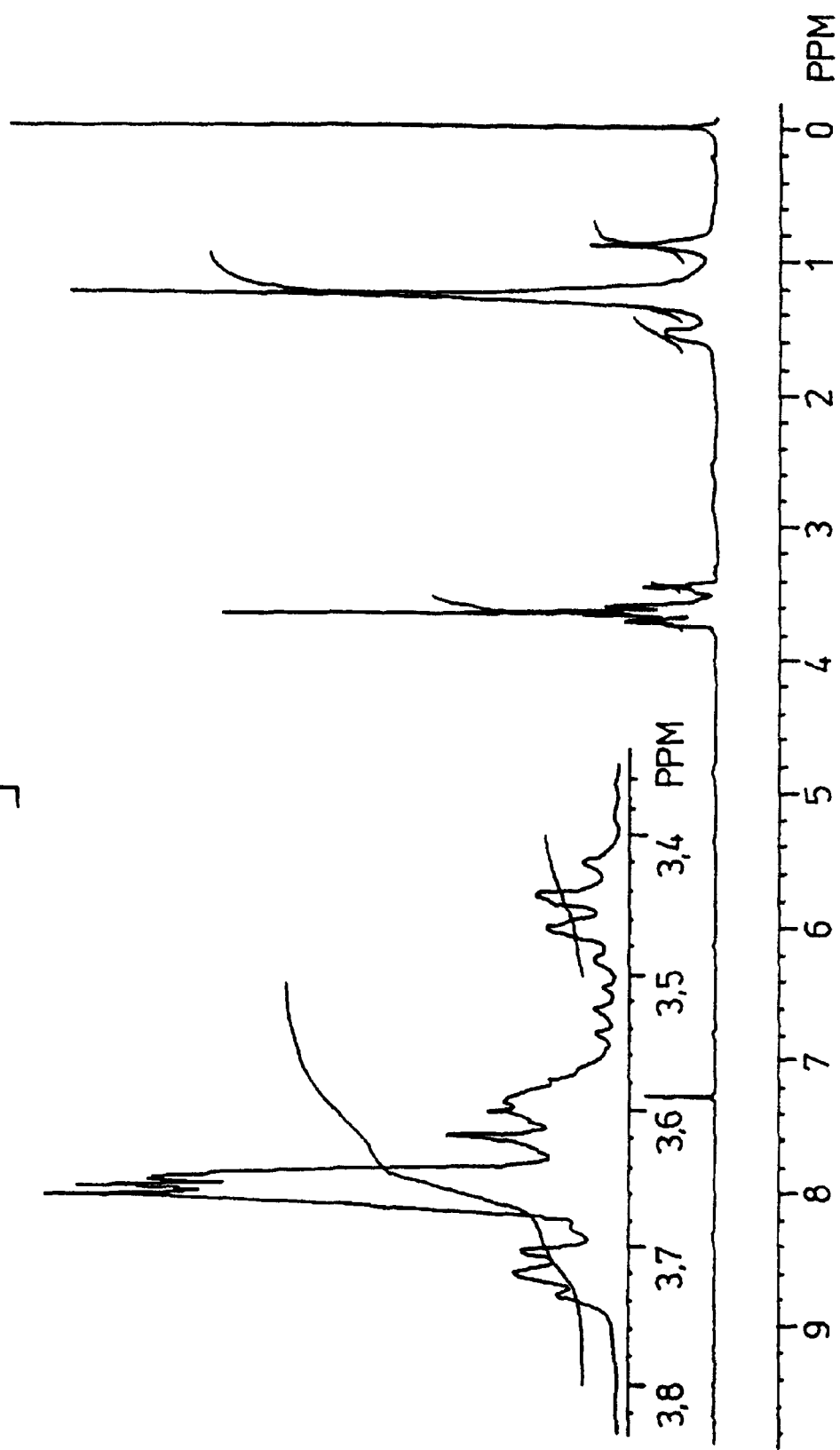

POLYETHER POLYOL AND A METHOD FOR THE MANUFACTURE OF MOULDABLE POLYESTER CONTAINING SAID POLYETHER POLYOL

The present invention relates to polyether polyol which is preferably used as a material for polyester or moulding, polyurethane elastomer or polyurethane for the manufacture of paint. It also relates to a method for the manufacture of moldable polyester where the above polyether polyol is one of the constituting units.

Polyesters for molding represented by polyethylene terephthalate and polybutylene terephthalate have excellent mechanical properties, heat resistance, etcetera and, therefore, they have been widely used for fibre, sheets, various bottles or films, and the like.

Basically, however, polyester is hydrolyzable and, accordingly, there is a problem that polyester has poor water resistance, alkali resistance and acid resistance whereby there have been many proposals for improving the resistance of polyester to hydrolysis.

As one of the means for improving the resistance of polyester to hydrolysis, there is a proposal where dimer dial is used as a part of polyhydric alcohol (laid-open Japanese patent publication Hei-03/252,419). However, dimer diol has a poor intersolubility with a hydrophilic compound such as ethylene glycol and terephthalic acid and, therefore, its rate of polymerization with such a hydrophilic compound is low. Thus, in the polyester prepared by a polycondensation of the dimer diol with terephthalic acid together with ethylene glycol or the like, an improvement in resistance to hydrolysis is still insufficient.

There are other proposals from the same point of view (laid-open Japanese patent publications Hei-02/263,827 and Hei-06/079,776) where dimer acid is used as a constituting component of polyester but the same problem as in the use of dimer diol occurs as well.

On the other hand, polyethylene terephthalate and polybutylene terephthalate have poor dyeing ability and that is a problem when they are used for fibre. As a means for improving that, there is a proposal where a high-boiling glycol prepared by adding ethylene oxide to alkylene glycol having 4–20 carbon atoms is used as a copolymerizing component (laid-open Japanese patent publication Sho-57/063,325). However, even in the polyester prepared by this method, resistance to hydrolysis is a bit unsatisfactory yet.

The present invention is to offer polyether polyol which shows, although having the same alkylene group as dimer diol as one of the constituting components, an excellent intersolubility with terephthalic acid and with hydrophilic compounds such as ethylene glycol. As a result of using such a polyether polyol as a part of the starting materials, it is now possible to manufacture polyester, polyurethane elastomer and polyurethane paint having an excellent resistance to hydrolysis. The present invention is also to offer a method for the manufacture of said polyester.

The present inventors have conducted an intensive study for solving the above problems and, as a result, have succeeded in accomplishing the present invention.

Thus, the present invention relates to polyether polyol having the following chemical formula (1).

$$HO-(AO)_m ZO-(BO)_n-H \quad (1)$$

wherein Z is a dimer diol residue; A and B are the same or different alkylene groups having 2–14 carbon atoms; and m and n are the same or different integers of 0 or more where $2 \leq (m+n) \leq 40$.

The present invention also relates to a method for the manufacture of mouldable polyester which is composed of the above-mentioned polyether polyol, alkylene glycol having 2–14 carbon atoms and aromatic dicarboxylic acid or dialkyl ester thereof wherein the amount of the dimer diol residue mentioned in the above paragraph is at least 1% by weight based on the total amount of all constituting units.

The present invention will be further illustrated as hereunder. Incidentally, the term "dimer diol residue" used in the present invention stands for the residue obtained by removal of two hydroxyl groups from a dimer diol molecule.

The polyether polyol of the present invention is a compound which has the above-mentioned chemical formula (1). Incidentally, polyether polyol where (m+n) in the formula (1) is less than 2 has a poor reactivity in the manufacture of polyester due to a poor intersolubility with terephthalic acid and with hydrophilic compounds such a ethylene glycol while, when (m+n) of the polyether polyol is more than 40, resistances to water and to hydrolysis of the polyester prepared therefrom are poor. Preferred number average molecular weight of the polyether polyol is from 600 to 3,000 in terms of a result calculated from hydroxyl values. When the number average molecular weight of the polyether polyol is less than 600, the reactivity in the manufacture of polyester is poor while, when it is more than 3,000, water resistance of the resulting polyester is poor.

Polyether polyol of the present invention may, for example, be manufactured by a method where alkylene oxide having 2–4 carbon atoms is added to dimer diol.

Dimer diol is a saturated aliphatic diol having 36 carbon atoms prepared by a complete hydrogenation of dimer acid. The dimer acid used as a starting material is obtained by dimerization, with heating, of unsaturated fatty acid having 18 carbon atoms such as oleic acid or linoleic acid. For example, commercially-available products such as Pespol HP-1000 which is sold from Toagosei Co., Ltd. may be used as the dimer diol.

Structurally, dimer diol is a mixture of many geometrical isomers due to a difference in the structure of the alkylene group which is a skeleton. Many branched alkyl groups are attached to the above-mentioned alkylene group in the dimer diol and that might be a reason why polyester and the like where the diner diol is one of the components have excellent resistance to hydrolysis.

Examples of the alkylene oxide having 2–4 carbon atoms are ethylene oxide, propylene oxide, butylene oxide and tetrahydrofuran (hereinafter, abbreviated as THF).

Known methods may be used for adding the above-mentioned alkylene oxide to dimer diol. Thus, when an alkylene oxide having a three-membered ring is used, a dimer diol wherein two hydroxyl groups are converted to alcoholate by sodium hydroxide or potassium hydroxide is heated at 100–140° C., a predetermined amount of alkylene oxide is added thereto with stirring and the alkylene oxide is subjected to an anionic polymerization using the dimer diol alcoholate as an initiating material.

When THF is used as an alkylene oxide, THF is subjected to a cationic ring-opening polymerization at about 0° C. in the presence of boron trifluoride ether salt and then the polymerization is stopped by adding disodium salt of diner diol thereto whereupon the desired polyether polyol is prepared.

Polyether polyol to which alkylene oxide having five or more carbon atoms is added has a high hydrophobicity and is poor in a copolymerizing ability with hydrophilic aromatic dicarboxylic acids.

Reactivity at polyesterification is low when the terminal is a secondary alcohol type in the polyether polyol of the present invention and, therefore, the use of the compound where the terminal is a primary alcohol type is preferred. When propylene oxide or butylene oxide is added to hydroxyl groups of dimer diol, terminals of the resulting polyether polyol become a secondary alcohol type and, in that case, it is preferred that the terminals of the polyether polyol are converted to a primary alcohol type.

Polyether polyol of the present invention can be preferably used as a material for the manufacture of polyester and polyurethane.

Polyurethane is manufactured by the reaction of polyether polyol of the present invention, a short-chain diol such as butanediol and, if necessary, polyester polyol with a polyisocyanate such as diphenylmethane diisocyanate.

In the manufacture of polyurethane by the reaction of a mixture of polyester polyol mainly comprising diner acid or dimer diol and a short-chain diol with polyisocyanate, it is possible to give polyurethane having excellent properties especially when the polyether polyol of the present invention is used as a part of polyhydric alcohol. Thus, polyester polyol mainly comprising dimer acid or dimer diol has a poor intersolubility with a short-chain alkyl diol such as butanediol and, as will be mentioned in Comparative Example 2 later, polyurethane which is prepared by the reaction of a mixture of said polyester polyol and a short-chain diol with diphenylmethane diisocyanate is turbid. On the other hand, however, when a part of the above polyester polyol is substituted with the polyether polyol of the present invention as mentioned in Application Example 2. it is possible to manufacture a homogeneous and transparent resin.

In the manufacture of polyester, it is preferred to use the polyether polyol of the present invention together with alkylene glycol having 2–4 carbon atoms as a polyhydric alcohol component. Specific examples of alkylene glycol having 2–4 carbon atoms are ethylene glycol, 1,2-propylene glycol, 1,3-propylene glycol and 1,4-butanediol and, among them, ethylene glycol and 1,4-butanediol are preferred.

Examples of polycarboxylic acid which is preferably used for the manufacture of polyester are aromatic dicarboxylic acids such as terephthalic acid, isophthalic acid, phthalic acid, 2,6-naphthalenedicarboxylic acid and 1,5-naphthalenedicarboxylic acid. Dialkyl esters of the above aromatic dicarboxylic acids are preferably used as well and the most preferred dialkyl esters are dimethyl esters. The polyester wherein the main compound in the acid components is terephthalic acid exhibits excellent mechanical strength and heat resistance and is particularly suitable for moulding.

Beside the above-mentioned polyester and polyurethane, it is also possible to give polyether wherein (meth)acryloyl groups are added to both terminals by the reaction of polyether polyol of the present invention with (ineth)acrylic acid. Such a polyether is used as a material for the manufacture of various plastics as well.

The present invention will be further illustrated by way of the following Example, Application Examples and Comparative Examples. Incidentally, the diner dial used in the following examples is Pespol HP-1000 (hereinafter, referred to as DD) which is available from Toagosei.

Figure 2:
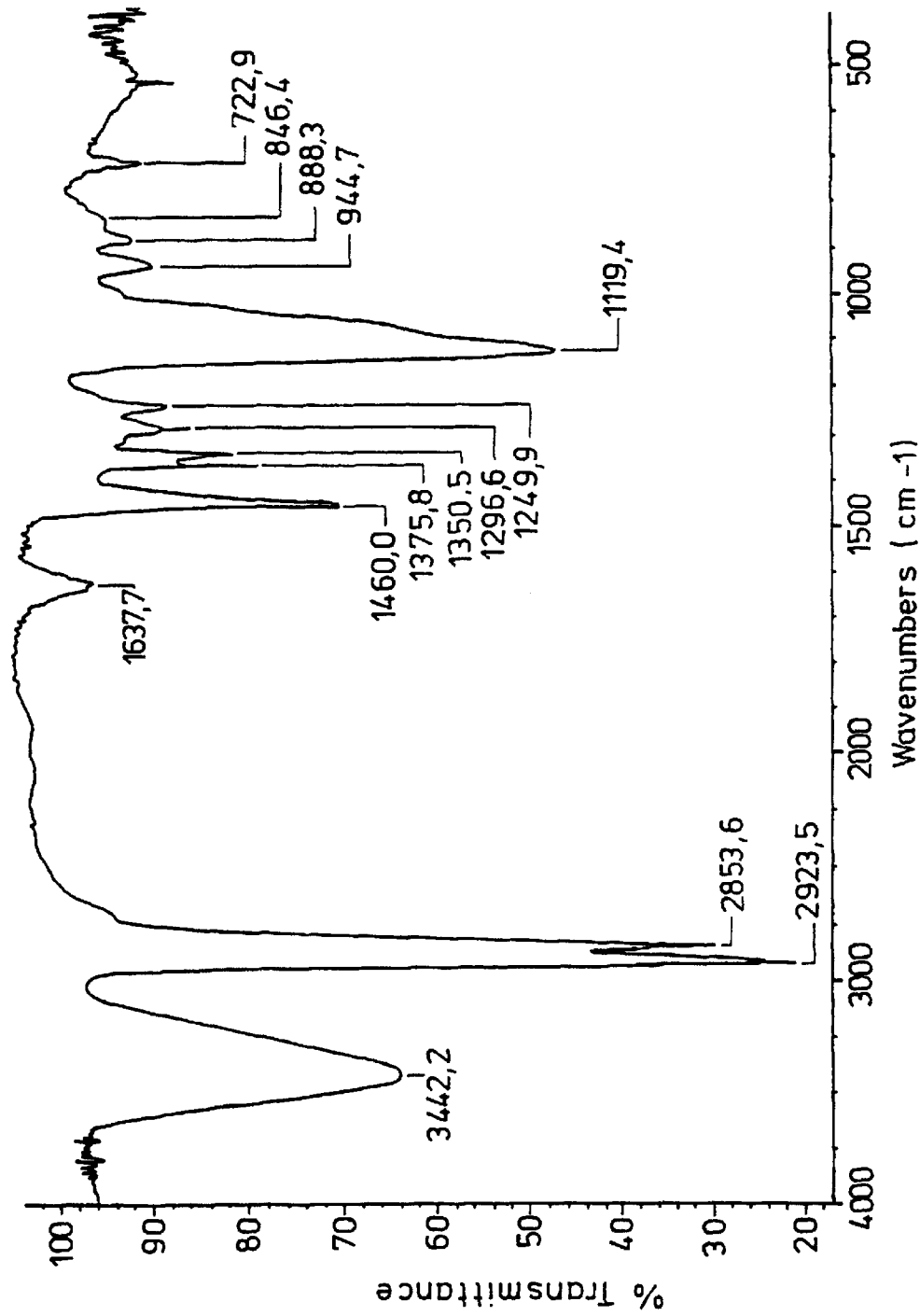

FIG. 1 is a $^1$H-NMR spectrum chart of the polyether polyol obtained in the Example; and FIG. 2 is an infrared absorption spectrum chart of the polyether polyol obtained in the Example.

EXAMPLE

DD (100.0 g; 0.187 mol) and 52.4 g (0.374 mol) of a 40% aqueous solution of potassium hydroxide were placed in an autoclave in which air was substituted with nitrogen and were dehydrated at 100° C. for three hours at the pressure of 5 mmHg to give a reaction product containing about 100 ppm of water. To this reaction product kept at 110–120° C. was added 49.4 g (1.122 inol) of ethylene oxide during four hours under pressure of about 5 kg/cm$^2$ to conduct a reaction. After that, the mixture was cooled to 60° C. and the remaining ethylene oxide was removed in vacuo (10 mmHg).

The reaction product was neutralized with hydrochloric acid and then dehydrated and filtered to give 143 g of polyether polyol having a hydroxyl value of 140.8 mg KOH/g (number average molecular weight: 800). As result of $^1$H-NMR analysis, the resulting polyether polyol was found to be a polyol where 6.0 mol of ethylene oxide was added to one mol of DD. Its $^1$H-NMR spectrum was shown in FIG. 1.

The resulting polyether polyol was further subjected to an elementary analysis and also to a measurement of infrared absorption. The infrared absorption spectrum was as shown in FIG. 2 while the result of the elementary analysis was that C=72.1% and H=12.1%

Application Example 1

Polyether polyol obtained in the above Example, dimethyl terephthalate (hereinafter, referred to as DMT), ethylene glycol (hereinafter, referred to as EG) and zinc acetate (used as a catalyst) in the amounts as given in Table 1 were placed in a reactor and heated up to 210° C. in an atmosphere of nitrogen of ordinary pressure and the resulting methanol was distilled away. After about 4–5 hours when no more methanol was distilled therefrom, antimony oxide was added and, during two hours, the mixture was made to heat up to 280° C. and also made in vacuo. After that, the reaction was continued for 2–3 hours and, when the reaction solution became highly viscous, the reaction was stopped.

Softness and resistance to hydrolysis (water resistance and alkali resistance) of the resulting polyester were measured by the following methods.

The resulting polyester was made into a sheet at 280° C. by means of an extrusion moulding and then elongated at 80° C. to an extend of 3.3-fold longer to both longitudinal and transverse directions to prepare a film having a thickness of 50 $\mu$m. The film was subjected to the following tests.

Softness was evaluated by conducting a tensile test at 0° C. in accordance with K7127 of JIS (the Japanese Industrial Standards) and shown in terms of elongated percentage (%) upon breakage.

Water resistance was evaluated as follows. Thus, the film was dipped in boiling water for two weeks and, after being well dried, tensile strength was measured and compared with that measured before dipping in boiling water. The resulting strength-retaining rate was used as in index for evaluation of water resistance.

Alkali resistance was evaluated as follows. Thus, the film was dipped for 24 hours in an aqueous solution of sodium hydroxide of 100° C. and then tensile strength was measured and compared with that measured before dipping. The resulting strength-retaining rate was used as an index for evaluation of alkali resistance.

Comparative Example 1

The same operation as in Application Example 1 was conducted except that dimer diol was used instead of polyether polyol in Application Example 1 to prepare polyester. Physical properties of the resulting polyester are as given in Table 1.

Application Example 2

Polyether polyol prepared in the aforementioned Example, polyester polyol synthesized from dimer acid and hexamethylenediol (trade name: Pespol 601; manufactured by Toagosei; hydroxyl value: 55 mg KOH/g), 1.4-butanediol and diphenylmethane diisocyanate in the amounts as mentioned in Table 2 (unit of the figures in Table 2: part by weight) were used whereupon polyurethane was manufactured by a one-shot method.

The resulting polyurethane was hardened by heating at 100° C. for 12 hours. A sheet having a thickness of 2 mm was moulded from the above-prepared polyurethane elastomer as a result of heating by means of an extrusion moulding. Transparency of the sheet was evaluated by naked eye.

Comparative Example 2

The same operation as in Application Example 2 using alcohol and polyisocyanate which were mentioned in Table 1 whereupon polyurethane was manufactured. Then transparency of a sheet of polyurethane elastomer obtained by the same operation as in the Application Example was evaluated.

TABLE 1

| | Application Example 1 | Comparative Example 1 |
|---|---|---|
| DMT (parts) | 57.5 | 57.5 |
| EG (parts) | 36.2 | 36.2 |
| Polyether polyol (parts) | 6.3 | — |
| Dimer diol (parts) | — | 6.3 |
| Zinc acetate (parts) | 0.03 | 0.03 |
| Antimony oxide (parts) | 0.04 | 0.04 |
| Softness (%) | 3.3 | 1.7 |
| Water resistance (%) | 88 | 80 |
| Alkali resistance (%) | 80 | 74 |

TABLE 2

| | Application Example 2 | Comparative Example 2 |
|---|---|---|
| Polyether polyol | 4.1 | — |
| Pespol 601 | 92.0 | 95.7 |
| 1,4-Butanediol | 3.9 | 4.3 |
| Diphenylmethane diisocyanate | 24.2 | 24.5 |
| Transparency of Sheet | transparent | turbid |

Although the polyether polyol of the present invention has a molecular structure where dimer diol residue is a skeleton, it has an excellent intersolubility with terephthalic acid and hydrophilic compounds such as ethylene glycol and produces copolymerized polyester or polyurethane in a high reaction ratio with such hydrophilic compounds. Polyester or polyurethane prepared as such has an extremely excellent hydrolysis resistance due to the dimer diol residues contained therein.

We claim:

1. A method for the manufacture of a moldable polyester, comprising the reaction of an alkylene glycol having 2–4 carbon atoms, an aromatic dicarboxylic acid or dialkyl ester thereof, and a polyether polyol of the formula HO—(AO)$_m$ZO—(BO)$_n$—H (in which Z is a dimer diol residue, A and B are the same or different alkylene groups having 2–4 carbon atoms, and m and n are the same or different integers of 0 or more where $2 \leq (m+n) \leq 40$).

2. The method of claim 1 where the amount of the dimer diol residue is at least 1% of the amount of all reactants.

3. The method of claim 1 where the number average molecular weight of the polyether polyol is from 600 to 3000.

4. The method of claim 1 where A and B are both —CH$_2$CH$_2$—.

5. The method of claim 1 where the alkylene glycol is selected from the group consisting of ethylene glycol and 1,4-butanediol.

6. The method of claim 1 where the aromatic dicarboxylic acid or dialkyl ester thereof is selected from the group consisting of terephthalic acid, isophthalic acid, phthalic acid, 2,6-naphthalenedicarboxylic acid, 1,5-naphthalenedicarboxylic acid, and the dialkyl esters thereof.

7. The method of claim 6 where the aromatic dicarboxylic acid or dialkyl ester thereof is selected from the group consisting of dimethyl terephthalate, dimethyl isophthalate, dimethyl phthalate, dimethyl 2,6-naphthalenedicarboxylate, and dimethyl 1,5-naphthalenedicarboxylate.

8. The method of claim 6 where the aromatic dicarboxylic acid or dialkyl ester thereof is terephthalic acid.

9. A moldable polyester prepared by the method of claim 1.

* * * * *